United States Patent
Oka et al.

(10) Patent No.: US 8,964,196 B2
(45) Date of Patent: Feb. 24, 2015

(54) SYSTEM FOR CONNECTING TO NEXT GENERATION NETWORKS

(71) Applicants: Kabushiki Kaisha Toshiba, Minato-ku, Tokyo (JP); Toshiba Tec Kabushiki Kaisha, Shinagawa-ku, Tokyo (JP)

(72) Inventors: Tomohide Oka, Shizuoka-ken (JP); Jun Sasano, Tokyo-to (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/749,863

(22) Filed: Jan. 25, 2013

(65) Prior Publication Data

US 2013/0201506 A1    Aug. 8, 2013

Related U.S. Application Data

(60) Provisional application No. 61/593,945, filed on Feb. 2, 2012.

(51) Int. Cl.
```
G06F 3/12      (2006.01)
H04N 1/00      (2006.01)
H04N 1/32      (2006.01)
```
(52) U.S. Cl.
CPC ........... *H04N 1/001* (2013.01); *H04N 1/00214* (2013.01); *H04N 1/00244* (2013.01); *H04N 1/32411* (2013.01); *H04N 2201/0062* (2013.01); *H04N 2201/0015* (2013.01); *H04N 2201/0067* (2013.01); *H04N 2201/0094* (2013.01)

USPC ......... 358/1.13; 358/1.15; 709/217; 709/227; 709/209

(58) Field of Classification Search
USPC ................. 358/1.13, 1.15; 709/217, 227, 209
See application file for complete search history.

(56) References Cited

U.S. PATENT DOCUMENTS

| | | | |
|---|---|---|---|
| 2005/0099651 A1 | 5/2005 | Kimura et al. | |
| 2010/0238503 A1* | 9/2010 | Sakuda et al. | 358/1.15 |
| 2010/0253962 A1* | 10/2010 | Higuchi et al. | 358/1.13 |
| 2013/0201523 A1* | 8/2013 | Oka et al. | 358/1.15 |

FOREIGN PATENT DOCUMENTS

JP    2011-193050    9/2011

* cited by examiner

*Primary Examiner* — Jacky X Zheng
(74) *Attorney, Agent, or Firm* — Amin, Turocy & Watson, LLP (57) ABSTRACT

There is provided a communication control apparatus, a center server, and a communication system capable of performing processing during a communication error at low cost without installation of any special functions. The communication control apparatus includes a call control unit which establishes communication connection with another apparatus by using SIP and a transmission and reception control unit which establishes communication connection with a predetermined center server which connects to the NGN if the other apparatus is not compatible with NGN data connection, transmits to the center server a command in which option values including target information of the other apparatus and a reroute processing request are designated, and transmits a file to the center server to cause the center server to transfer a file obtained by converting the file to the other apparatus.

8 Claims, 6 Drawing Sheets

SYSTEM FOR CONNECTING TO NEXT GENERATION NETWORKS

CROSS-REFERENCE TO RELATED APPLICATIONS

This application is based upon and claims the benefit of priority from U.S. Provisional Application No. 61/593,945 filed on Feb. 2, 2012; the entire contents of which are incorporated herein by reference.

FIELD

Embodiments described herein relate generally to a communication control apparatus, a center server, and a communication system.

BACKGROUND

In recent years, a technique for communication using an IP (Internet Protocol) network called VoIP (Voice over IP) was developed as broadbandization of access networks using ADSL (Asymmetric Digital Subscriber Line), FTTH (Fiber To The Home), and the like was dramatically distributed.

As such a network, a network called an NGN (Next Generation Network) capable of performing video image communication, high speed data communication, and the like as well as sound communication was also proposed, for example.

On the other hand, the IETF (Internet Engineer Task Force) which is an organization for internet standardization defines SIP (Session Initiation Protocol). SIP is a protocol which was standardized as a technique for realizing real time communication (for example, an IP telephone, a video meeting, and the like) on an IP network.

DETAILED DESCRIPTION

In order that a communication control apparatus transfer an image file, the communication control apparatus can execute file transfer through connection by the SIP protocol if the destination apparatus is compatible with NGN data connection. However, if the destination apparatus is a G3FAX, for example, and is not compatible with the NGN data connection, an error occurs and communication connection cannot be established.

In the related art, if an error occurs where communication connection cannot be established, the communication control apparatus executes a reroute processing (processing for changing a transfer route) as follows. A high resolution color image (for example, color 600 DPI, JPEG) to be transmitted is converted (reduced) into a G3FAX standard format (for example, 200 DPI A4 TIFF, RFC2306). Then, the communication control apparatus sets a target telephone number in an e-mail address and sends the image to an MFP using the T.37 protocol. The MFP uses the built-in T.37 Off-Ramp function and transmits the reduced image to the G3FAX.

However, such reroute processing has the following problems.

(1) The MFP is required to include the Off-Ramp function. The Off-Ramp function is a function by which a telephone number in an e-mail is interpreted, a call is made to a public switched telephone network (PSTN), and a TIFF attached file is transmitted to a G3FAX as a modem image signal.

(2) The communication control apparatus is required to have a temporary storage function with large capacity and high-speed processing capability in order to convert A3/color/600 DPI image (about 210 MB in a non-compressed state), and it takes long time to start reroute communication by an inexpensive HW.

A main function of the communication control apparatus is file transfer by NGN data connection. Therefore, it is unnecessary to mount the Off-Ramp function on the MFP only for performing processing during a communication error. Furthermore, it is unnecessary to enhance the processing capability of the communication control apparatus only for performing the processing during a communication error.

The present application was made in view of the above circumstances, and an object thereof is to provide a communication control apparatus, a center server, and a communication system capable of performing processing during a communication error at low cost without the installation of special functions.

According to an exemplary embodiment for resolving the above problems, there is provide a communication control apparatus which connects to an NGN (Next Generation Network), the apparatus including a call control unit which establishes communication connection with another apparatus by using a SIP (Session Initiation Protocol) and a transmission and reception control unit which establishes communication connection with a predetermined center server which connects to an NGN if the other apparatus is not compatible with an NGN data connection, transmits to the center server a command in which option values including target information of the other apparatus and a reroute processing request are designated, and transmits a file to the center server to cause the center server to transfer a file obtained by converting the file to the other apparatus.

Figure 1:
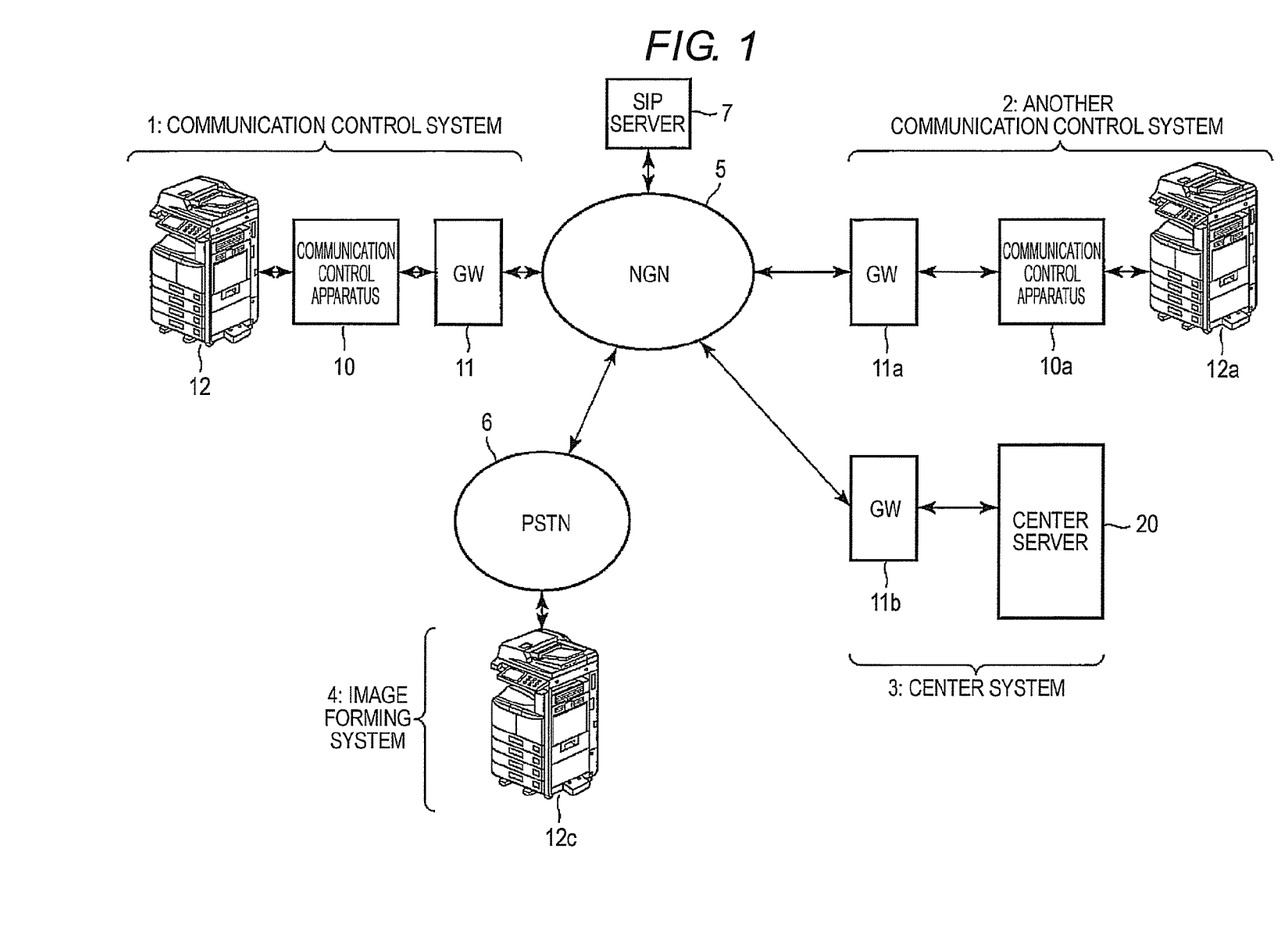
FIG. 1 is an exemplary diagram showing a configuration of a communication system provided with a communication control apparatus according to an embodiment.

FIG. 1 is an exemplary diagram showing a configuration of a communication system provided with a communication control apparatus according to an embodiment.

The communication system includes a communication control system 1, another communication control system 2, a center system 3, an image formation system 4, an NGN 5, a PSTN 6, and an SIP server 7.

The communication control system 1, another communication control system 2, and the image forming system 4 are systems respectively owned by users and are installed in respective sites of the users. The center system 3 is a system owned by an operator of the NGN 5 and the PSTN 6 and provided in order to expand and promote utilization of information exchange using the NGN 5, for example. The SIP server 7 is a server owned by the operator of the NGN 5 and collectively manages the NGN 5 so as to effectively perform information exchange operations using the NGN 5.

Although the NGN 5 and the PSTN 6 are respectively illustrated as different networks in FIG. 1, the NGN 5 and the PSTN 6 may be physically the same network. That is, the network may be understood as the NGN 5 in data transmission and reception using SIP, and the network may be understood as the PSTN 6 in data transmission and reception using the T.37 protocol.

The communication control system 1 includes a communication control apparatus 10, a gateway (GW) 11, and an MFP 12. The gateway 11 is connected to the NGN 5 and is also connected to the communication control apparatus 10. The communication control apparatus 10 is an adaptor (interface) for data transmission and reception with another communication control system 2 or the like, which is connected to the NGN 5 via the gateway 11, using SIP. The MFP 12 has a function of totally utilizing various functions of office devices such as an image receiving function by a FAX, an image receiving function by an e-mail, and a print image receiving function by a network as well as scanning, reading, and copying an image with a designated resolution and sheet size.

The NGN 5 forms an information communication network capable of performing high definition video communication and high speed data communication in addition to the sound communication as described above. The NGN 5 is configured on the basis of an IP technology, and not only connection by SIP but also connection using HTTP (HyperText Transfer Protocol) through the Internet can be made between the communication control systems.

Another communication control system 2 includes a communication control apparatus 10*a*, a gateway 11*a*, and an MFP 12*a*. Since a configuration and operations of another communication control system 2 are the same as those of the communication control system 1, detailed description thereof will be omitted.

The center system 3 includes a center server 20 and a gateway 11*b*. The gateway 11 is connected to the NGN 5 and is also connected to the center server 20. The center server 20 is further connected to the PSTN 6 and exchanges data with the MFP 12*c* of the image forming system 4.

Figure 2:
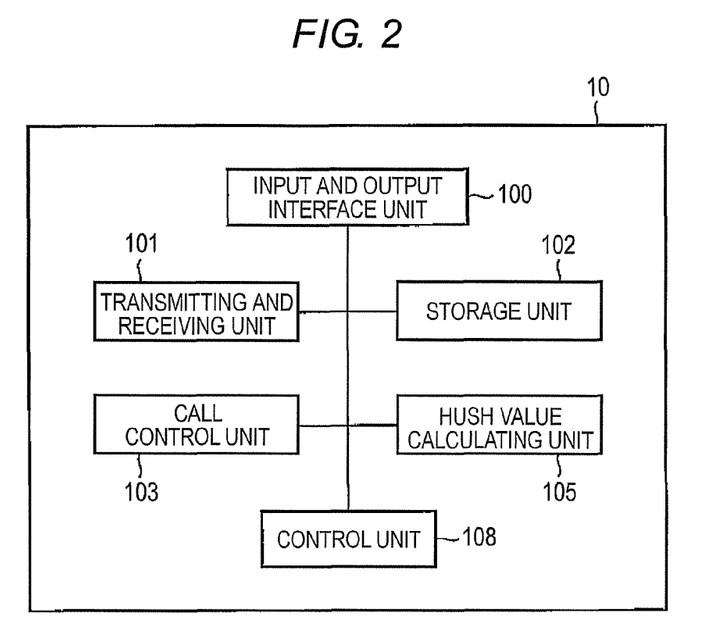
FIG. 2 is an exemplary diagram showing a configuration of the communication control apparatus according to the embodiment.

FIG. 2 is an exemplary diagram showing configuration of the communication control apparatus according to the embodiment.

The communication control apparatus 10 includes an input and output interface unit 100, a transmitting and receiving unit 101, a storage unit 102, a call control unit 103, a hash value calculating unit 105, and a control unit 108.

The input and output interface unit 100 is an interface for executing signal exchange with another communication control system 2 via the NGN 5 and further executing a signal exchange operation with the MFP 12 with signal connection. The transmitting and receiving unit 101 controls information transmitting and receiving operations. The storage unit 102 stores data files such as images, destination address information, information accompanying the transmission data (which will be described later in detail), and the like. Here, an SD card, an HD card, or the like can be used as the storage unit 102. The call control unit 103 executes connecting operations with another communication control system 2 and with the center system 3 by SIP. The hash value calculating unit 105 calculates a hash value in authentication information used in communication. The control unit 108 collectively controls operations of the communication control apparatus 10.

Figure 3:
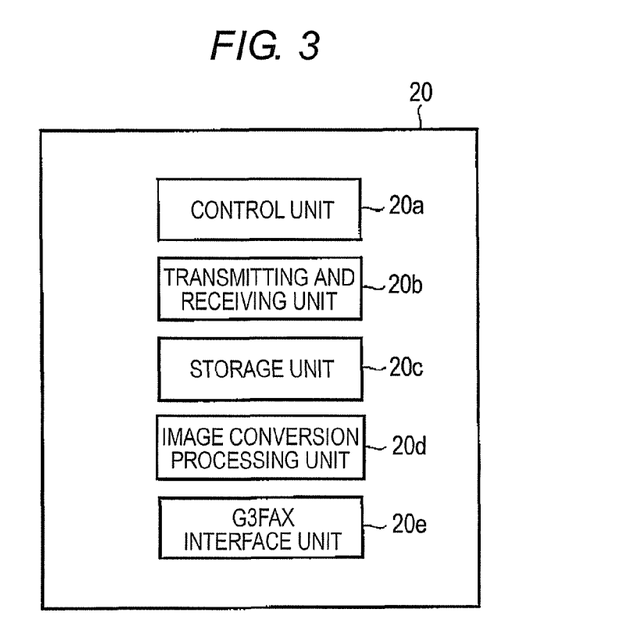
FIG. 3 is an exemplary diagram showing a configuration of a control system in a center server which connects a signal with the communication control apparatus according to the embodiment.

FIG. 3 is an exemplary diagram showing a configuration of a control system in the center server 20 with signal connection with the communication control apparatus according to the embodiment.

The center server 20 is provided with a control unit 20*a*, a transmitting and receiving unit 20*b*, a storage unit 20*c*, an image conversion processing unit 20*d*, and a G3FAX interface unit 20*e*. The control unit 20*a* connectively controls operations of the center server 20. The transmitting and receiving unit 20*b* transmits and receives information by the NGN 5 via the gateway 11*b*. The storage unit 20*c* stores data files such as images, destination address information, information accompanying transmission data, and the like. The image conversion processing unit 20*d* converse a high resolution image transmitted via the NGN 5 into an image in a G3FAX standard format. The G3FAX interface unit 20*e* is an interface for exchanging information with the MFP 12*a* via the PSTN 6.

Figure 4:
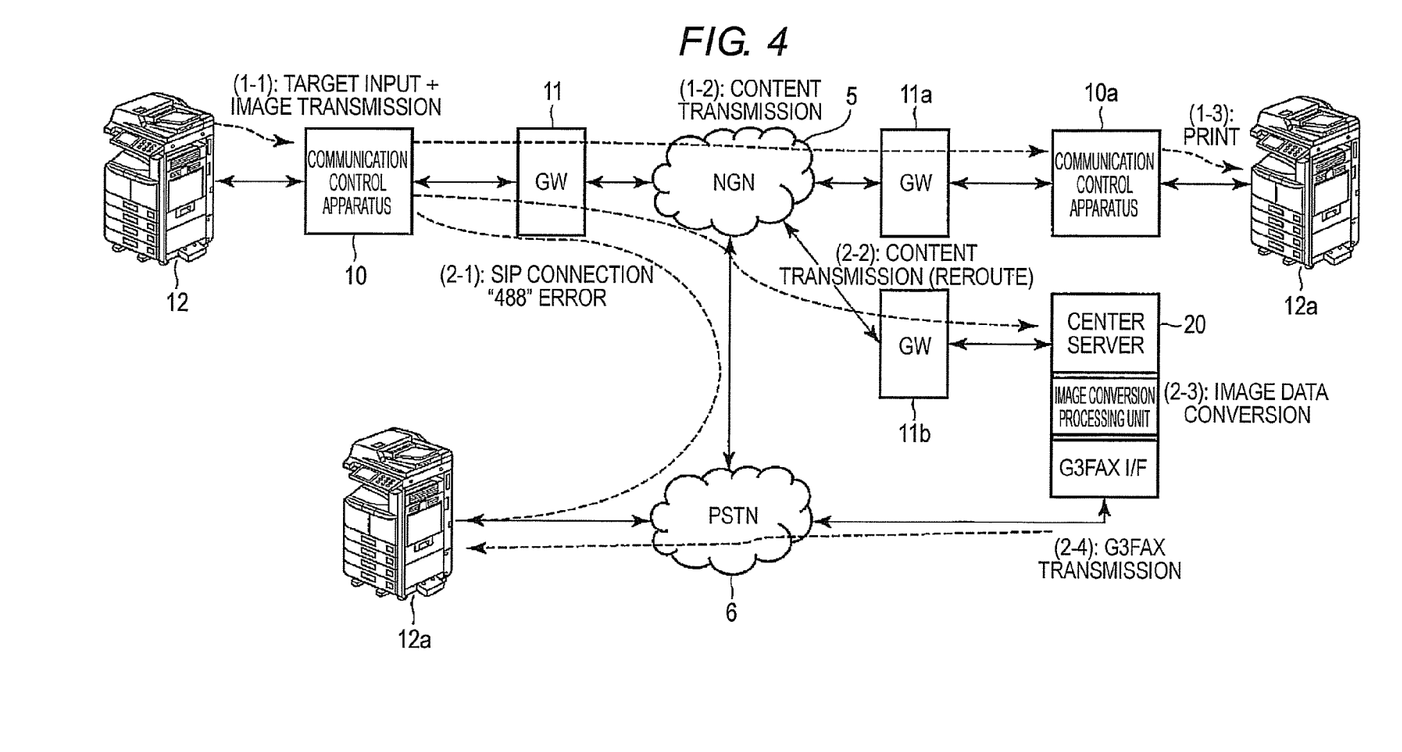
FIG. 4 is an exemplary diagram illustrating reroute processing during a communication error by the communication control apparatus according to the embodiment.

FIG. 4 is an exemplary diagram illustrating reroute processing during a communication error by the communication control apparatus according to the embodiment. In order to simplify the description, FIG. 4 shows only apparatuses necessary for the description.

Procedure in Normal Situation (1-1) A user designates an image to be transmitted and a target and instructs transmission from a control panel of the MFP 12. The communication control apparatus 10 which received the instruction connects to the target phone number by the SIP protocol.

(1-2) Since the destination communication control apparatus 10*a* is compatible with the NGN data connection, the communication control apparatus 10 connects directly and executes content transmission (image file transfer) by the SOAP/HTTP protocols.

(1-3) The destination communication control apparatus 10*a* transmits the received image file to the MFP 12*a*. The MFP 12*a* prints the image file.

Reroute Procedure in Abnormal Situation (1-1) The user designates an image to be transmitted and a target and instructs transmission from the control panel of the MFP 12. The communication control apparatus 10 which received the instruction attempts to connect to the target telephone number by the SIP protocol. That is, the call control unit 103 transmits the SIP method "INVITE" to the destination to establish a session.

(2-1) The destination MFP 12 is not compatible with the NGN data connection. Therefore, a reply of a SIP connection error "488 Not Acceptable Here" is made to the communication control apparatus 10 in response to the SIP INVITE.

(2-2) The communication control apparatus 10 transmits the "target telephone number" and the "image file" to a predetermined center server 20. In addition, it is possible to add and transmit "additional information" in the transmission of the image file. As the additional information, an ID number and an authentication code are provided. The center server 20 receives the image file when the additional information coincides with an ID number and an authentication code which are registered in advance. In so doing, it is possible to confirm that the reroute processing to be performed by the center server 20 is based on a request from the appropriate communication control apparatus 10, secure security, and charge the reroute processing.

(2-3) The center server 20 performs conversion processing on the image information into the G3FAX standard format.

Since the image information is transmitted to the MFP 12a via the center server 20, there is a concern of information relating to the communication control apparatus 10 as a transmission source being lost. Therefore, the center server may embed and transmit target information of the communication control apparatus 10 as the transmission source in the image information. Alternatively, the target information may be set in TSI (Transmission Source Information), and transmission to the G3FAX may be then performed.

(2-4) The center server 20 transmits the image information, on which conversion processing into the G3FAX standard format was performed, to the MFP 12a via the PSTN 6.

Figure 5:
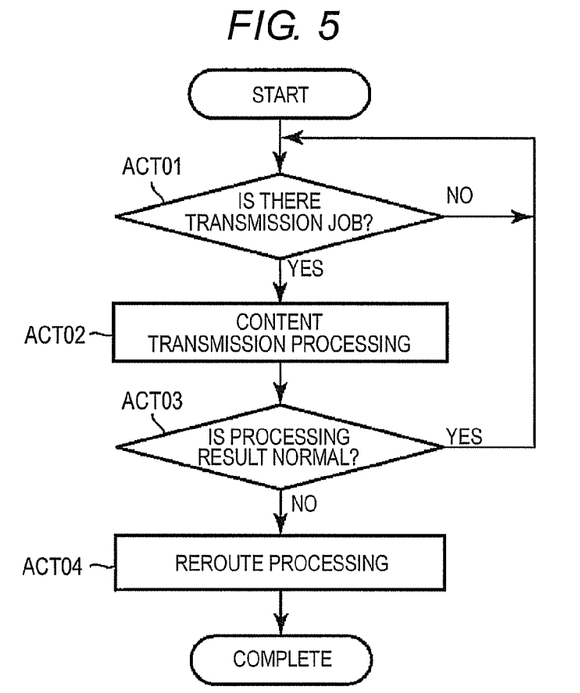
FIG. 5 is an exemplary diagram showing a communication processing procedure by the communication control apparatus according to the embodiment.

FIG. 5 is an exemplary diagram showing a communication processing procedure by the communication control apparatus according to the embodiment. The control unit 108 of the communication control apparatus 10 collectively controls the processing.

In Act 01, the communication control apparatus 10 monitors for the presence of a job to be transmitted. If there is no job to be transmitted (NO in Act 01), the communication control apparatus 10 waits. If there is a job to be transmitted (YES in Act 01), the communication control apparatus 10 executes content transmission processing by using SIP in Act 02.

In Act 03, the communication control apparatus 10 monitors for a response to the transmission processing result. If the transmission is made normally (YES in Act 03), the communication control apparatus 10 returns to Act 01 and monitors for the presence of a next transmission job. If a "488 error" occurs in transmission (NO in Act 03), the communication control apparatus 10 executes reroute processing of the content transmission. That is, the communication control apparatus 10 transmits the content to the predetermined center server 20. Since the center server 20 is compatible with the NGN data connection, the center server 20 can perform transmission normally without occurrence of the "488 error".

Figure 6:
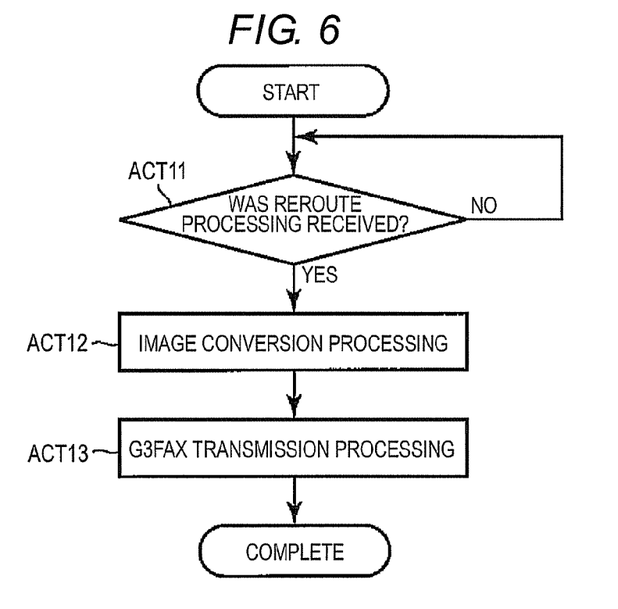
FIG. 6 is an exemplary diagram showing a communication processing procedure by a center server which the communication control apparatus according to the embodiment instructs performance of the reroute processing.

FIG. 6 is an exemplary diagram showing a communication processing procedure by the center server which the communication control apparatus according to the embodiment instructs performance of the reroute processing. The control unit 20a of the center server 20 collectively controls the processing.

In Act 11, the center server 20 monitors for the presence of reception of the reroute processing. If there is no reroute processing job (NO in Act 11), the center server 20 waits. If a reroute processing job is received (YES in Act 11), the center server 20 performs conversion processing on the transmitted image information into the G3FAX standard format in Act 12. In Act 13, the center server 20 transmits the image information, on which the conversion processing was performed, to a reroute destination. Since the reroute destination is not compatible with the NGN data connection, the reroute destination executes communication via an interface which is compatible with the G3FAX communication.

Figure 7:
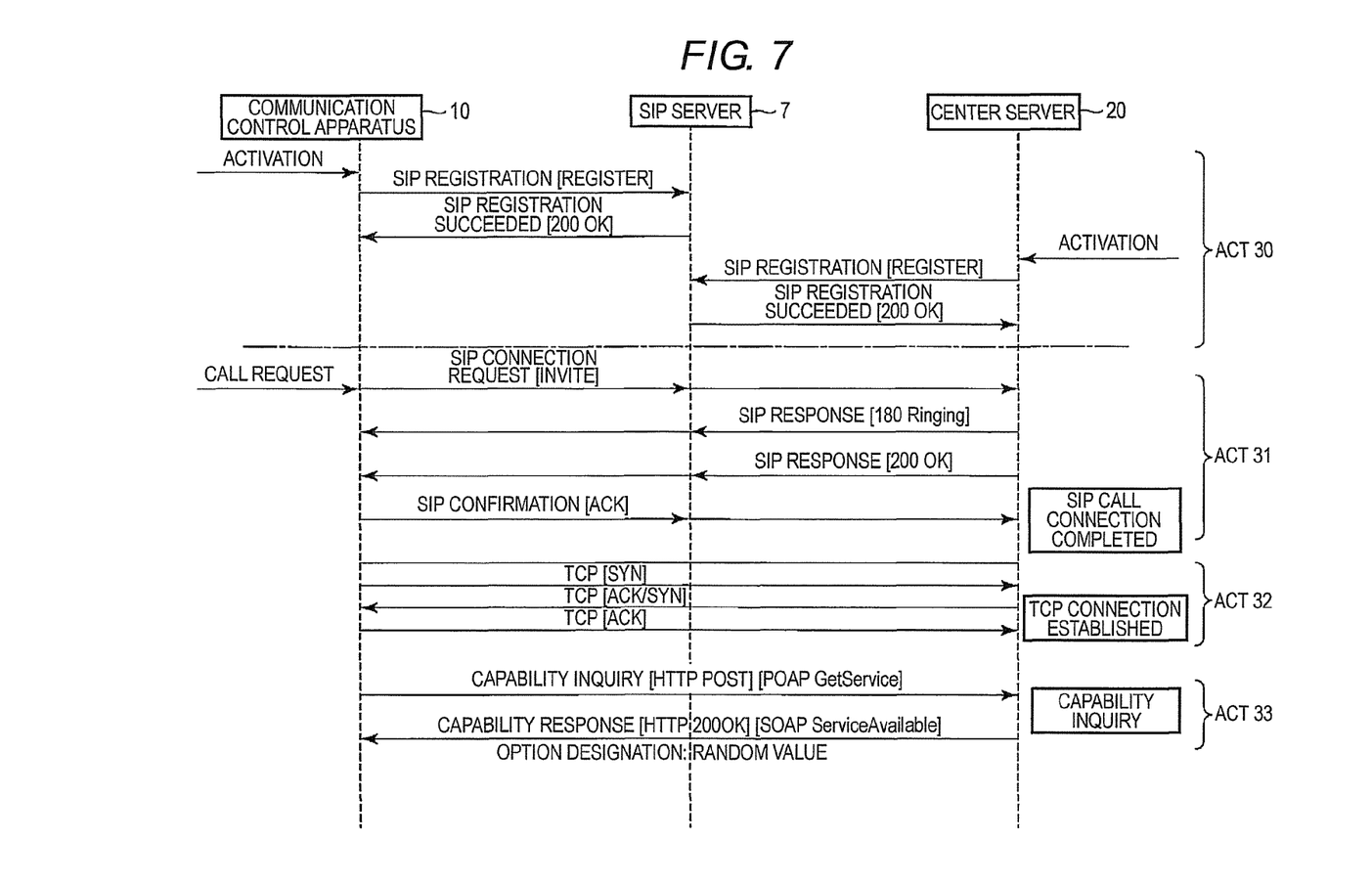
FIG. 7 is an exemplary diagram showing a communication procedure between the communication control apparatus and the center server according to the embodiment.
Figure 8:
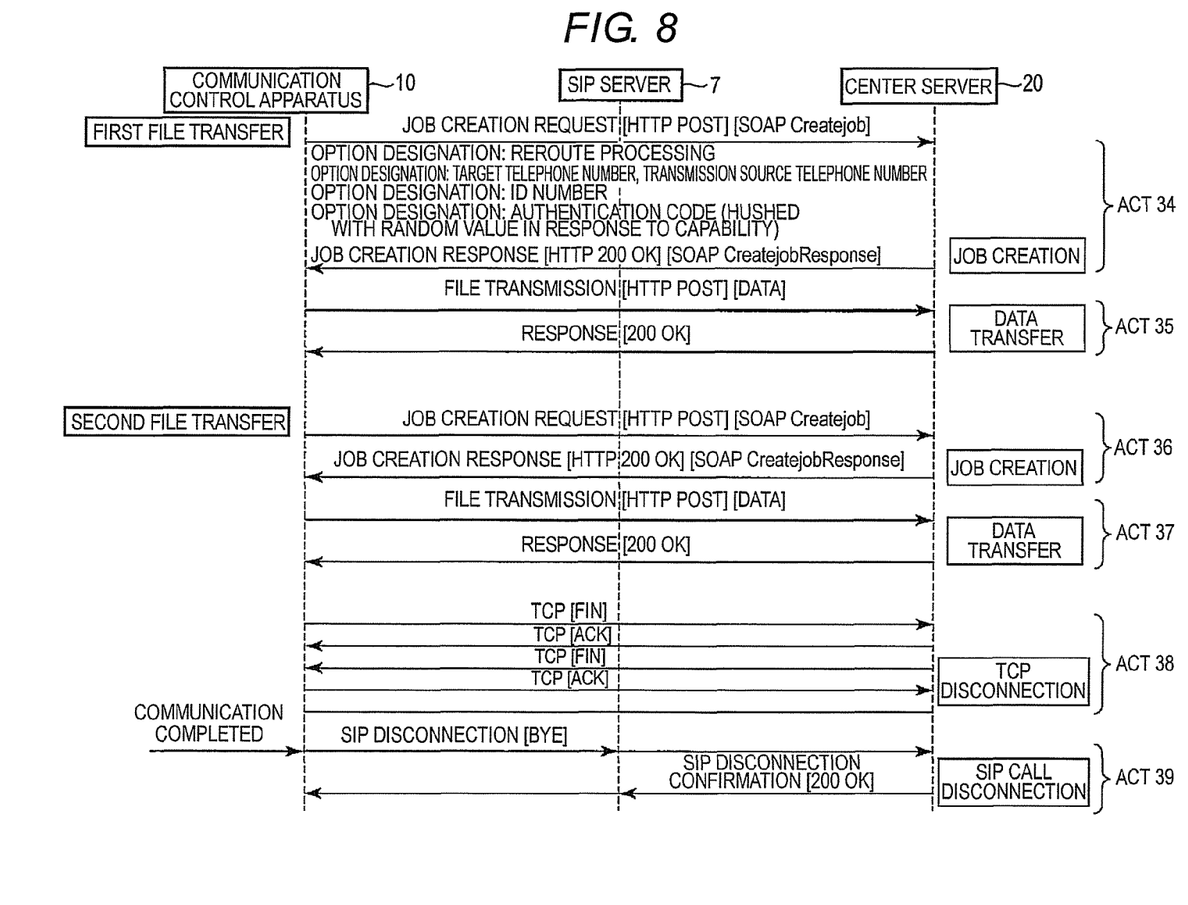
FIG. 8 is an exemplary diagram showing a communication procedure between the communication control apparatus and the center server according to the embodiment.

FIGS. 7 and 8 are exemplary diagrams showing a communication procedure between the communication control apparatus and the center server according to the embodiment.

(1) In Act 30, the communication control apparatus 10 and the center server 20 respectively request registration to the SIP server 7 after being activated.

The communication control apparatus 10 transmits REGISTER to the SIP server 7 and offers SIP registration after being activated. The SIP server replies "200OK" and informs the communication control apparatus 10 of a fact that the SIP registration succeeded. The center server 20 transmits REGISTER to the SIP server 7 and offers SIP registration. The SIP server replies "200OK" and informs the center server 20 that the SIP registration succeeded.

Thereafter, the communication control apparatus 10 and the center server 20 can perform communication using SIP via the SIP server 7.

(2) Act 31 shows SIP call connection processing.

The communication control apparatus 10 outputs the SIP method "INVITE" in order to establish a session. "INVITE" is transmitted to the center server 20 via the SIP server 7. The center server 20 receives "INVITE" and transmits a temporary reply "180Ringing", which represents that the processing is being executed, to the calling side. After the completion of the processing, the center server 20 transmits a success reply "200OK", which represents that the requested processing succeeded" to the calling side. The communication control apparatus 10 which received the success reply "200OK" transmits "ACK", which indicates that session establishment was confirmed, to the center server 20.

(3) In Act 32, TCP connection processing is executed. In the connection processing by the TCP, the communication control apparatus 10 and the center server 20 directly exchange signals without the SIP server 7 interposed therebetween.

The communication control apparatus 10 transmits "SYN" to the center server 20 in order to establish a TCP connection. The center server 20 replies "ACK/SYN" to the communication control apparatus 10. The communication control apparatus 10 transmits "ACK" to the center server 20. The TCP connection is established by such a handshake.

(4) In Act 33, capability inquiry processing is executed.

The communication control apparatus 10 transmits to the center server 20 the command "HTTP POST" which represents that data is transmitted using HTTP and a command "SOAP GetService" which indicates that the service described by SOAP is GetService. The center server 20 replies to the communication control apparatus 10 with a response "HTTP 200 OK" and "SOAP ServiceAvailable" which indicates the capability in response to the inquiry.

At this time, the center server 20 instructs the communication control apparatus 10 about a "random value" for calculating a hash value through option designation.

(5) In Act 34, job creation is requested in order to transfer a first file.

The communication control apparatus 10 transmits to the center server 20 a command "SOAP CreateJob" for requesting job creation. Option values for requesting reroute processing are additionally designated in the command, and the command is transmitted along with target telephone number information and transmission source telephone number information. In addition, as the option values to be transmitted, an ID number and an authentication code are additionally included. Here, the authentication code is a value obtained by hash calculation using the "random value" transmitted from the center server 20 in capability response in Act 33.

The center server 20 receives the job creation command from the communication control apparatus 10, recognizes the reroute processing request, and if the ID number and the authentication code coincide with an ID number and an authentication code which are registered in advance, replies job creation responses "HTTP 200 OK" and "SOAP CreateJobResponse" to the communication control apparatus 10.

(6) In Act 35, transmission of the first file is executed.

The communication control apparatus 10 transmits an image file along with commands "HTTP POST" and "DATA" to the center server 20. The center server 20 which received the file replies a response "HTTP 200 OK" to the communication control apparatus 10.

(7) In Acts 36 and 37, transfer processing of a second file is executed. Since the processing is the same as the transfer processing of the first file, a detailed description will be omitted. In addition, information indicating transfer of a final file is set in the option designation in the case of transfer processing of the final file.

(8) In Act 38, the TCP connection is disconnected.

The communication control apparatus 10 transmits "FIN" to the center server 20 in order to disconnect the TCP connection. The center server 20 replies "ACK" to the communication control apparatus 10. The center server 20 transmits "FIN" to the communication control apparatus 10 in order to disconnect the TCP connection. The communication control apparatus 10 replies "ACK" to the center server 20. Through this handshake, the TCP connection is disconnected.

(9) Act 39 shows SIP call disconnection processing.

If the communication is completed, the communication control apparatus 10 transmits a SIP disconnection command "BYE" to the center server 20 via the SIP server 7. The center server 20 replies a SIP disconnection confirmation command "200 OK" to the communication control apparatus 10.

In addition, the processing from Act 32 to Act 38 can be charged.

According to the aforementioned embodiment, various effects can be achieved.

(1) Since image transfer is performed using a communication network such as the NGN 5 or the PSTN 6, it is possible to realize more secure communication compared with transfer using the Internet or e-mail.

(2) The MFP is not required to include special functions for rerouting, such as a T.37 Off-Ramp function. Therefore, it is possible to suppress an increase in the cost of the MFP.

(3) Since the communication control apparatus is not required to have a temporary storage function with large capacity and high-speed processing capability, it is possible to use an inexpensive apparatus.

The various functions described in the aforementioned embodiment may be configured by using hardware or may be realized by using software causing a computer to read a program in which the various functions are described. In addition, the various functions may be configured by appropriately selecting any of the software and the hardware.

Furthermore, the various functions can be realized by causing a computer to read a program stored on a recording medium which is not shown in the drawings. In relation to the recording medium in this embodiment, any recording format is applicable as long as the recording medium can record the program and can be read by the computer.

In addition, the present disclosure is not limited to the above embodiment in an unchanged form and can be put into effect in an implementation phase while components are modified without departing from the gist thereof.

Various exemplary embodiments can be formed in appropriate combinations of the plurality of components disclosed in the above embodiment. For example, some components may be deleted from the all of the components described in the embodiment. Furthermore, components in different embodiments may be appropriately combined.

What is claimed is:

1. A communication control apparatus which connects to an NGN (Next Generation Network), the apparatus comprising:
a call control unit which establishes communication connection with another apparatus by using a SIP (Session Initiation Protocol); and
a transmission and reception control unit which establishes communication connection with a predetermined center server which connects to an NGN if the other apparatus is not compatible with an NGN data connection, transmits to the center server a command in which option values including target information of the other apparatus, a reroute processing request, target information, ID information, and an authentication code of the communication control apparatus are designated, and transmits a file to the center server to cause the center server to transfer a file obtained by converting the file to the other apparatus.

2. The apparatus according to claim 1,
wherein the other apparatus is a G3FAX,
wherein the file transmitted to the center server is high resolution image information, and
wherein the converted file includes image information in a G3FAX standard format.

3. The apparatus according to claim 1,
wherein target information of the communication control apparatus is embedded in the image information in the converted file.

4. A center server which connects to an NGN (Next Generation Network), the center server comprising:
a transmitting and receiving unit which receives a command from a communication control apparatus which connects to the NGN, option values being designated in the command, the option values including target information of another apparatus which is not compatible with the NGN data connection, a reroute processing request, target information, ID information, and an authentication code of the communication control apparatus; and
an image conversion processing unit which receives a file from the communication control apparatus and converts the received file,
wherein the transmitting and receiving unit transfers the converted file to the other apparatus.

5. The server according to claim 4,
wherein the other apparatus is a G3FAX,
wherein the file transmitted to the center server is high resolution image information, and
wherein the converted file includes image information in a G3FAX standard format.

6. The server according to claim 4,
wherein target information of the communication control apparatus is embedded in the image information in the converted file.

7. A communication system comprising:
a communication control apparatus and a center server which connect to an NGN (Next Generation Network),
wherein the communication control apparatus includes
a call control unit which establishes communication connection with another apparatus by using SIP (Session Initiation Protocol) and
a transmission and reception control unit which establishes communication connection with a predetermined center server which connects to the NGN if the other apparatus is not compatible with the NGN data connection, transmits to the center server a command in which option values including target information of the other apparatus, a reroute processing request, target information, ID information, and an authentication code of the communication control apparatus are designated, and transmits a file to the center server,
wherein the center server includes
a transmitting and receiving unit which receives the command from the communication control apparatus, option values being designated in the command, the option values including target information of the other apparatus which is not compatible with the NGN data connection, the reroute processing request, target information, ID information, and an authentication code of the communication control apparatus, and an image conversion processing unit which receives a file from the communication control apparatus and converts the received file, and wherein the transmitting and receiving unit transfers the converted file to the other apparatus.

8. The system according to claim 7, wherein the other apparatus is a G3FAX, wherein the file transmitted to the center server is high resolution image information, and wherein the converted file includes image information in a G3FAX standard format.

* * * * *